US008960645B1

(12) United States Patent
Stewart

(10) Patent No.: US 8,960,645 B1
(45) Date of Patent: Feb. 24, 2015

(54) AIRPLANE JACK

(71) Applicant: Steven S Stewart, Palm Springs, CA (US)

(72) Inventor: Steven S Stewart, Palm Springs, CA (US)

(*) Notice: Subject to any disclaimer, the term of this patent is extended or adjusted under 35 U.S.C. 154(b) by 0 days.

(21) Appl. No.: 14/255,993

(22) Filed: Apr. 18, 2014

(51) Int. Cl.
B66F 5/04 (2006.01)
B66F 3/08 (2006.01)
B64F 1/00 (2006.01)

(52) U.S. Cl.
CPC .... *B66F 3/08* (2013.01); *B64F 1/00* (2013.01)
USPC ........................................ 254/2 B; 254/133 R

(58) Field of Classification Search
USPC .......... 254/2 B, 10 B, 10 C, 10 R, 133 R, 134
See application file for complete search history.

(56) References Cited

U.S. PATENT DOCUMENTS

| 2,903,258 | A | 9/1956 | Jovanovich | |
|---|---|---|---|---|
| 3,902,699 | A | 9/1975 | Brackett | |
| 4,854,803 | A | 8/1989 | Coccaro | |
| 5,232,203 | A | 8/1993 | Butts | |
| 6,926,254 | B1* | 8/2005 | Nymann | 254/8 R |
| 7,942,383 | B2 | 5/2011 | Tharp | |
| 8,448,921 | B2* | 5/2013 | Hernandez | 254/88 |
| 8,608,130 | B2* | 12/2013 | Gann et al. | 254/1 |
| 2011/0278518 | A1* | 11/2011 | Rindlay | 254/133 R |
| 2013/0092889 | A1* | 4/2013 | Griffiths | 254/133 R |
| 2013/0264530 | A1* | 10/2013 | Gann et al. | 254/1 |

OTHER PUBLICATIONS

Aircraft Spruce & Specialty Company of Corona, California and Peachtree City, Georgia; 2011-2012 Catalog; Cover page and p. 735 (on which appears an advertisement for Aero Jack Kit), followed by an enlargement by Applicant of the photo appearing in said advertisement.

* cited by examiner

*Primary Examiner* — Lee D Wilson
(74) *Attorney, Agent, or Firm* — Loyal McKinley Hanson

(57) ABSTRACT

An airplane jack apparatus includes a jack and a strut-cradling jack pad (i.e., SCJP) for lifting a selected flat, spring-steel strut of an airplane landing gear in order to thereby raise the associated main landing gear assembly. Forward and rearward components of the SCJP define diametrically opposite, left-strut-cradling and right-strut-cradling sides of the SCJP. A jack-coupling axle extends between the forward and rearward components along an axle axis of rotation, while a jack-coupling component couples the upper end of the jack to the axle pivotally. As a result, a user can pivot the SCJP about the axle axis of rotation between a left-strut-cradling position of the SCJP, in which the left-strut-cradling side of the SCJP faces upwardly, and a right-strut-cradling position of the SCJP in which the right-strut-cradling side of the SCJP faces upwardly, all without strut-dependent readjustment of the SCJP.

6 Claims, 9 Drawing Sheets

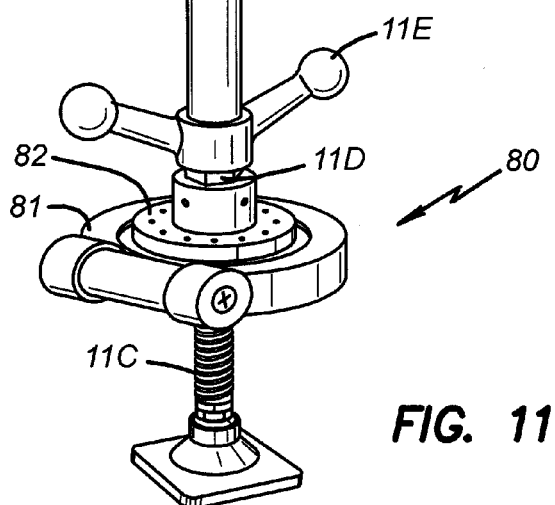
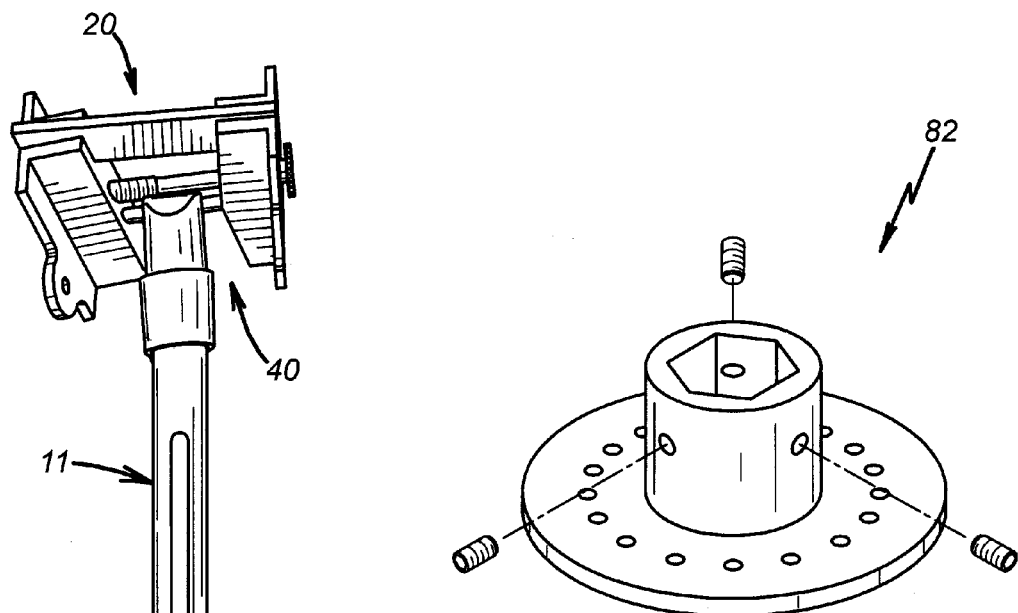
FIG. 11
FIG. 12

AIRPLANE JACK

BACKGROUND OF THE INVENTION

1. Technical Field

This invention relates generally to the fields of aircraft and jacks for lifting aircraft wheels for inspection and/or servicing. It relates more particularly to a lifting device for raising the main wheel assemblies of a tricycle or tail wheel landing gear.

2. Description of Related Art

The front and main wheel assemblies of a light aircraft equipped with a tricycle landing gear (e.g., the light aircraft sold under the trademark CESSNA, including models 172, 150, 172, 172RG, 175, 170, 182, 206, RV's, and Mustang II), must occasionally be raised relative to the pavement or other horizontal support surface for inspection and/or servicing purposes. Existing devices for doing this include heavy duty hydraulic jacks and the inconvenience of moving them from a shop or hangar to a remotely located aircraft. Some existing devices grip the propeller. Others bear upwardly on the underside of the wings. In either case, the user must exercise great care to avoid damaging the propeller, motor mounts, wings, and other components of the aircraft.

Some main-wheel-assembly lifting devices attempt to avoid damage by lifting the main struts of the tricycle land gear. A jack pad is provided that grips a selected one of the left and right main struts so that accompanying jack components can apply lifting force to the strut via the jack pad. Doing so lifts the wheel assembly. Although effective in some respects, existing jack pads must be reconfigured and readjusted, or disassembled and reassembled, according to which of the left and right struts they are to grip for any particular lifting operation. That must be done because the struts are tapered; they increase in width toward the fuselage, with a forward edge of the strut extending parallel to the lateral axis of the airplane and a rearward edge inclined. In addition, such existing jack pads have only limited adjustability. Furthermore, they can scratch, mark, or otherwise mar the struts, and they are prone to fall free from the struts during placement for use on the struts.

SUMMARY OF THE INVENTION

In view of the foregoing, it is a primary object of the invention described herein to provide a lifting device for light aircraft that alleviates the concerns outlined above. The present invention achieves this objective predicated on the inventor's realization of the above concerns and the conception of an airplane jack assembly having an improved jack pad (also referred to herein as a "strut-cradling jack pad" or the acronym "SCJP") that alleviates those concerns. The SCJP has oppositely facing, left and right, strut-cradling sides such that a user can bring an appropriate one of the two sides into alignment with the selected strut by pivoting the SCJP about a horizontal axis. Once it has been pivoted into position, the SCJP cradles the selected strut with structure that can be initially adjusted to accommodate strut width, and that works symmetrically on both left and right main landing gear struts without further strut-dependent readjustment of the SCJP.

To paraphrase some of the more precise language appearing in the claims and further introduce the nomenclature used, an apparatus (i.e., an assembly) for lifting a selected strut on an airplane landing gear having left and right flat, spring-steel struts, in order to thereby raise the associated left or right main landing gear assembly, includes a jack and a strut-cradling jack pad (i.e., SCJP). Forward and rearward components of the SCJP cooperatively form diametrically opposite, left and right strut-cradling sides of the SCJP. A jack-coupling axle extends between the forward and rearward components along an axis of rotation, while a jack-coupling component couples the jack to the jack-coupling axle pivotally. As a result, a user can pivot the SCJP between a left-strut-cradling position of the SCJP in which the left-strut-cradling side of the SCJP faces upwardly, and a right-strut-cradling position of the SCJP in which the right-strut-cradling side of the SCJP faces upwardly, all without strut-dependent readjustment of the SCJP. Moreover, the weight of the jack and SCJP assembly is only about five pounds (2.268 kilograms).

Initial strut-width accommodating adjustment is provided, along with a removably mounted rod that spans the forward and rearward components over an upper side of the selected strut in order to safely secure the SCJP. Preferably, a tubular-strut adapter is included that adapts the SCJP to use with tubular struts. One embodiment includes a screw jack actuator component for rotating the lead screw of the jack with power derived from a separate electric or pneumatic power driver or other power source.

Thus, the invention provides a new and improved airplane jack that is convenient to use while providing weight and safety advantages. The following detailed description and accompanying illustrative drawings make the foregoing and other objects, features, and advantages of the invention more apparent.

BRIEF DESCRIPTION OF THE DRAWINGS

FIG. 11 is a perspective view of the airplane jack with a lead screw actuator assembly installed on the jack;

FIG. 12 is an enlarged perspective view of just the flange portion of the actuator assembly that serves to secure the assembly on the nut of the jack.

DESCRIPTION OF THE PREFERRED EMBODIMENTS

Figure 1:
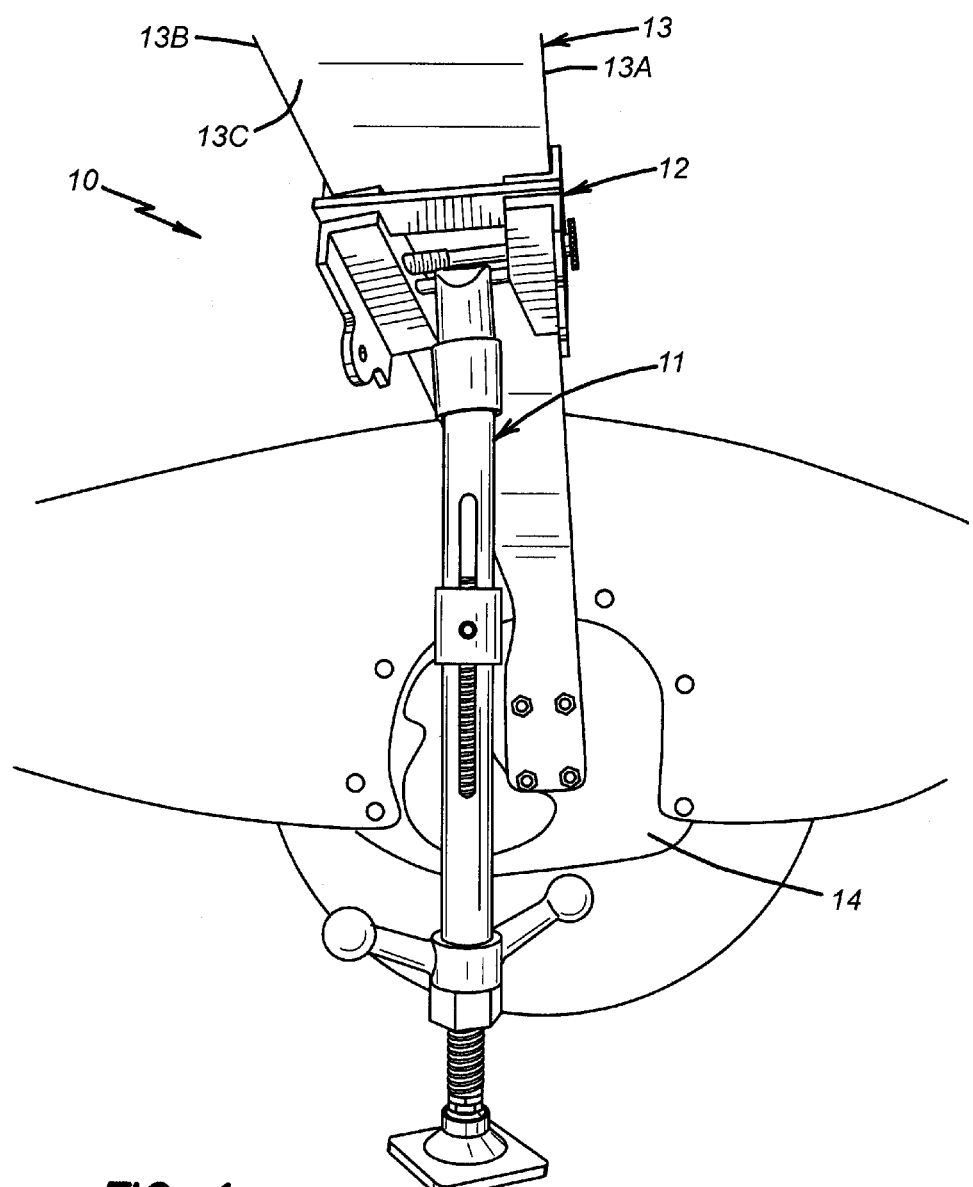
FIG. 1 of the drawings is a perspective view of a portion of the left main landing gear assembly of a CESSNA 172 airplane as viewed from the left seat of the airplane with the airplane at rest on a horizontal support surface and with an airplane jack constructed according to the invention shown in an operative position for lifting the left wheel assembly.

Turning now to FIG. 1 of the drawings, it is a perspective view of a portion of the left main landing gear assembly of a CESSNA 172 airplane as viewed from the left seat of the airplane. The airplane (not illustrated in its entirety) is at rest on a level tarmac or other horizontal support surface. It represents any of various airplanes having a tricycle landing gear with two, similar, flat, spring-steel struts that increase in width from the main landing gear wheel toward the fuselage.

FIG. 1 includes an airplane jack apparatus 10 constructed according to the present invention that is shown in an operative position for lifting the left main landing gear wheel assembly. Generally, the apparatus 10 is an assembly of a jack 11 component and a SCJP 12 component. The jack 11 is a known type of component that produces a vertically upward directed lifting force, while the SCJP 12 is a structure that interfaces the jack 11 to the selected strut; the SCJP 12 transfers the lifting force from the jack to the selected strut, preferably helping protect the selected strut from scratches, dents, or other damage that might occur if the jack 11 were to otherwise bear directly against the selected strut. The SCJP 12 cradles the selected main landing gear strut of the airplane (e.g., a left strut 13) while the jack 11 produces a lifting force that the SCJP 12 transfers to the left strut 13 for purposes of raising the left main landing gear assembly 14 for repair or maintenance.

In cradling the left strut 13 in a "left-strut-cradling position" (LSC position) of the SCJP 12, the SCJP 12 abuts a forward edge 13A of the left strut 13, an edge that extends parallel to the lateral axis of the airplane (i.e., it faces and bears rearwardly against the forward edge 13A). It also abuts a rearward edge 13B that is inclined relative to the forward edge 13A (i.e., not parallel), facing and bearing forwardly against the rearward edge 13B, and it abuts an underside 13C of the strut 13 that extends between the forward and rearward edges 13A and 13B (i.e., facing and bearing upwardly against the underside 13C). The SCJP 12 cradles the right strut in a similar manner in a "right-strut-cradling position" (RSC position) of the SCJP 12.

According to a major aspect of the invention, components of the SCJP 12 are sized, shaped, and interconnected so that a user can pivot the SCJP 12 relative to an upwardly disposed end portion 11A (FIG. 2) of the jack 11, between the left-strut-cradling position of the SCJP 12 and the right-strut-cradling position. The user can do that to accommodate the taper of the struts without having to readjust or disassemble and reassemble the SCJP 12 in the manner of prior art jack pad devices. Remember that the flat, spring-steel struts of a tricycle landing gear are tapered, increasing in width from the outer wheel portion of the strut to the inner fuselage portion of the strut (e.g., about a ten-degree taper on some struts). As a result of that taper, prior art jack pad devices require readjustment or disassembly and reassembly. The SCJP 12, however, works despite that taper by virtue of its left and right two-sided configuration and the pivot ability that enables a user to bring the desired side into alignment with a strut to be lifted. The various components of the SCJP 12 are sized, shaped, and interconnected to work with flat, tapered, spring-steel struts of a landing gear in the sense that the various components are sized, shaped, and interconnected to cooperatively work together as described herein.

Figure 13:
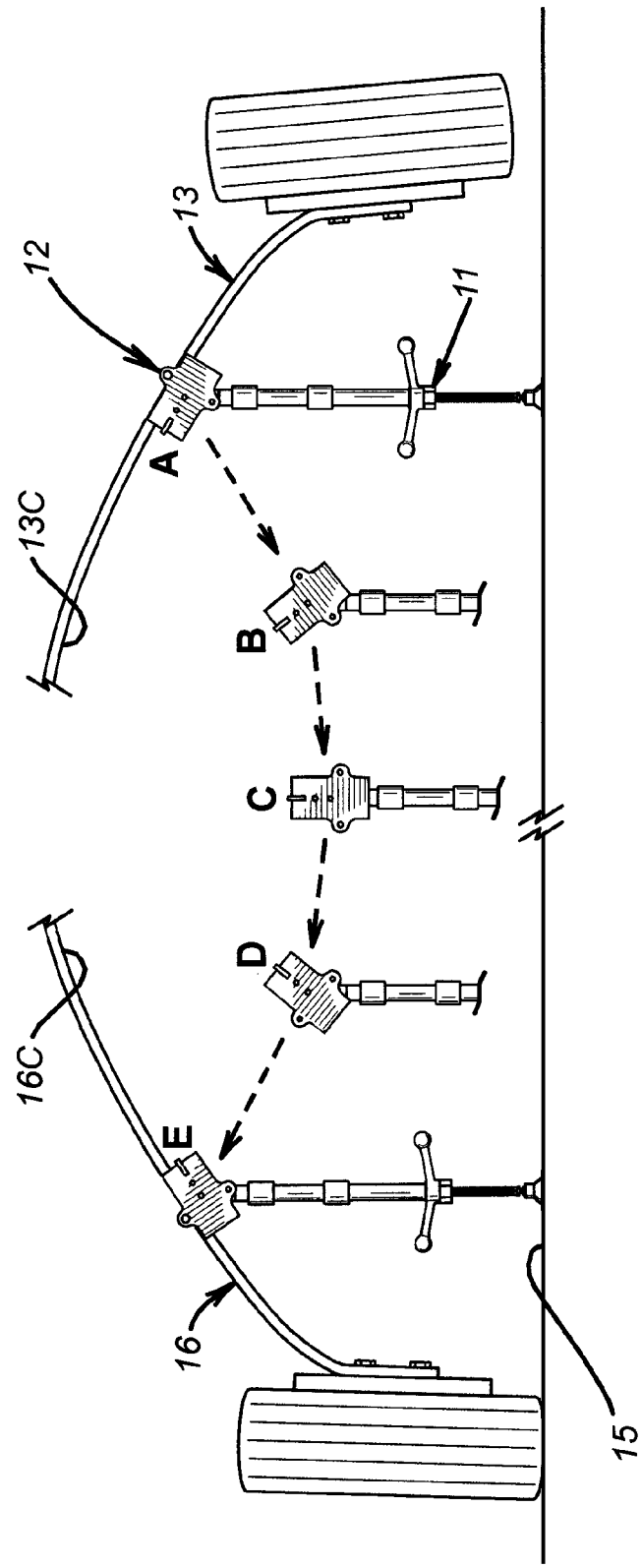
FIG. 13 is a diagrammatic front view of the main landing gear struts that summarizes how the SCJP is pivoted about the rotational axis of the SCJP when going from left-strut usage to right-strut usage.

FIG. 13 summarizes how the pivoting-jack-pad aspect of the invention works. It shows five positions of the SCJP 12 (identified in FIG. 13 by the reference letters A, B, C, D, and E) through which the user pivots the SCJP 12 in moving from left-strut usage to right-strut usage. The user pivots the jack pad 12 through those five positions in moving from the left-strut-cradling position A (i.e, the LSC position A for use in lifting upwardly against the underside 13C of the left strut 13 relative to a horizontal support surface 15), to the right-strut-cradling position E (i.e., the RSC position E for use in lifting upwardly against an underside 16C of a right strut 16). In working that way, the SCJP 12 overcomes shortcomings of prior art SCJP devices.

Figure 2:
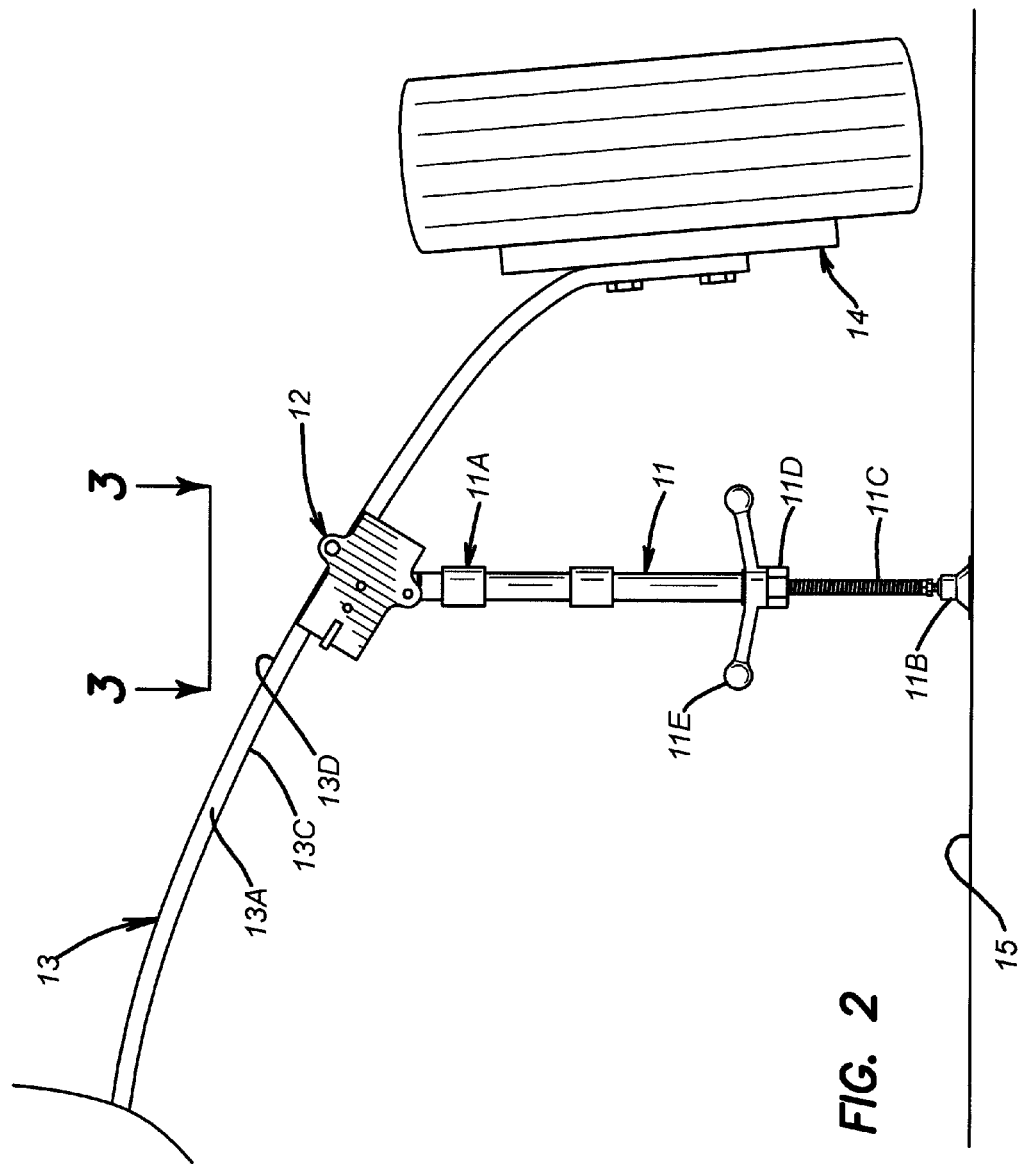
FIG. 2 of the drawings is a front elevation view of the left main landing gear assembly and the airplane jack.

Before focusing on FIG. 13 further, however, consider the additional nomenclature and details of construction introduced with reference to FIGS. 2 through 12. FIG. 2 is an enlarged front elevation view of the airplane jack apparatus 10, shown lifting the left wheel assembly 14 relative to the horizontal support surface 15. The apparatus 10 is shown in an operative position for lifting the left strut 13 and the SCJP 12 is in the left-strut-cradling position, with the forward edge 13A and underside 13C of the left strut 13 being visible. The jack 11 includes the upwardly disposed end portion 11A mentioned previously that is coupled pivotally to the SCJP 12; it also includes a base 11B, a lead screw 11C (i.e., a threaded rod), a nut 11D, a handle 11E for turning the nut 11D, a torque pin 11F, a torque pin shield 11G, and a thrust bearing 11H. The nut 11D accepts a wrench for additional torque when needed; it also accepts an actuator assembly that is described later on with reference to FIG. 11. Turning the handle 11D results in a vertically directed force against the SCJP 12 that the SCJP 12 transfers to the underside 13C of the left strut 13 for lifting purposes.

Figure 3:
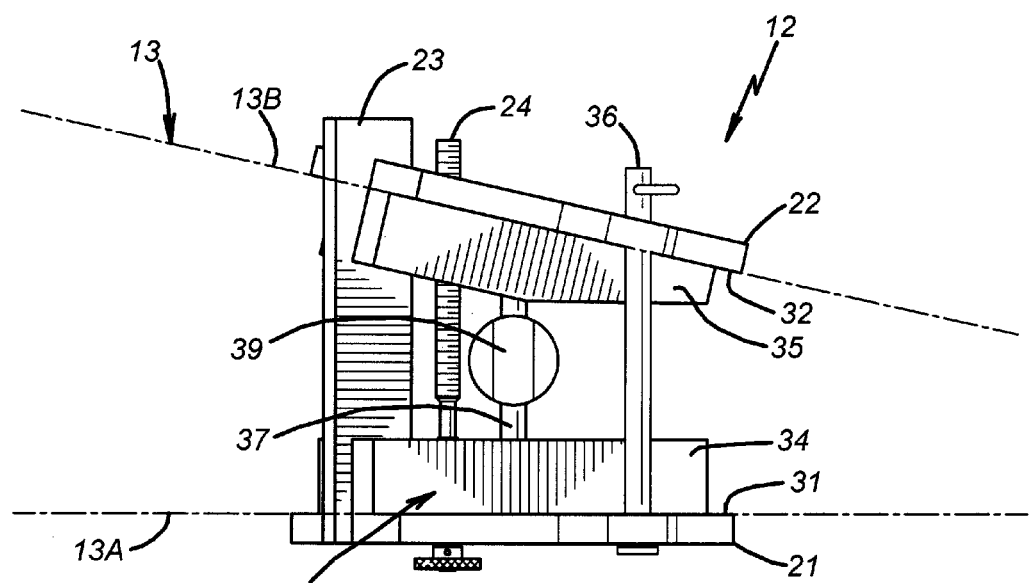
FIG. 3 is a top plan view of the SCJP portion of the airplane jack, as view from a horizontal plane that contains a line 3-3 in FIG. 2.

FIG. 3 is top plan view of the SCJP 12, as view from a horizontal plane that contains a line 3-3 in FIG. 2. It shows a left-strut-cradling side 20 of the SCJP 12 (i.e., an LSC side 20), along with the left strut 13 and its forward and rearward edges 13A and 13B (depicted by phantom lines) to illustrate the tapered width of the strut that increases toward the fuselage. The SCJP 12 includes a forward component 21 and a rearward component 22 (e.g., machined from aluminum stock) that are interconnected in a space-apart relationship to each other by a stabilizing bar 23 and a width-adjusting screw 24. The stabilizing bar 23 is welded or otherwise rigidly attached to the forward component 21 so that the action of the user operating the width-adjusting screw 24 (as depicted by a curved arrow in FIG. 4) causes the rearward component 22 to slide along the stabilizing bar 23 (as depicted by a double-headed arrow in FIG. 4) in order to thereby vary the spacing between the forward and rearward components 21 and 22 according to the width of the strut 13.

In an operative position of the SCJP 12, with the airplane at rest on the horizontal support surface 15, the SCJP 12 cradles the selected strut. The SCJP 12 "cradles" the selected strut in that position in the sense that it has (i) a vertically extending forward surface facing the forward edge of the selected strut, (ii) a vertically extending rearward surface facing the rearward edge of the selected strut, and (iii) a horizontally extending lower surface facing the underside of the selected strut. The horizontally extending lower surface includes a forward horizontally extending surface segment that is provided by the forward component of the SCJP 12, and a rearward horizontally extending surface segment that is provided by the rearward component of the SCJP 12.

More particularly, using nomenclature for the SCJP 12, the left-strut-cradling side 20 of the SCJP 12 includes a vertically extending left-side or first forward surface 31 that is provided by the forward component 21 of the SCJP 12 (FIG. 3). It also includes a vertically extending left-side or first rearward surface 32 that is provided by the rearward component 22. A horizontally extending first left-side surface segment 34 provided by the forward component 21 and a horizontally extending second left-side surface segment 35 provided by the rearward component 22 combine to form a horizontally extending lower surface that faces the underside 13C of the left strut 13.

FIG. 3 also shows a locking component 36 mounted removably on the forward and rearward components 21 and 22. It may take the form of a 0.25-inch diameter cylindrical rod (i.e., a rod having a diameter of about 6.35 millimeters). It is mounted in a position to span the forward and rearward components 21 and 22 and an upper side 13D of the left strut 13 (i.e., the upper side 13D identified in FIG. 2) when the SCJP 12 is in the operative position on the left strut 13. The locking component 36 functions as securing means for securing the SCJP 12 on the left strut 13. It works (i.e., functions) in a similar manner when the SCJP 12 is in the right-strut-cradling position.

Figure 4:
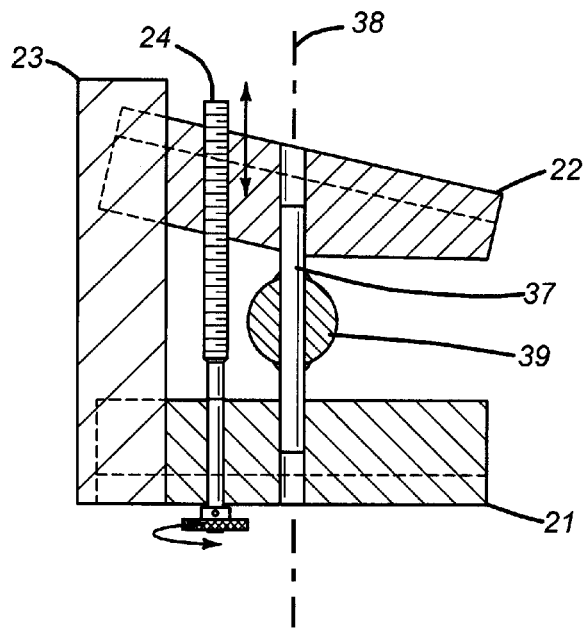
FIG. 4 is a cross-sectional view of the SCJP shown in FIG. 3, as viewed in a horizontal plane.

FIG. 4 is a cross-sectional view of the SCJP 12 as viewed looking upwardly in a horizontal plane, with the locking component 36 omitted for illustrative purposes. As such, FIG. 4 shows an axle 37 extending along an axle axis 38 that is disposed horizontally when the SCJP 12 is in the operative position. The illustrated axle 37 is, for example, a tool steel rod with a 0.375-inch diameter (i.e., 9.53 millimeter diameter), although tool steel rods with other diameters may be used, including a 0.4375-inch diameter (11.1125 millimeter diameter). A coupling component 39 connected to the axle 37 couples the upwardly disposed end portion 11A of the jack 11 to the SCJP 12 pivotally, for pivotal movement about the axle axis 38. That pivotal movement enables movement between the left-strut-cradling and right-strut-cradling positions of the SCJP 12, and the coupling component 39 is discussed in further detail later on with reference to FIG. 7.

Figure 5:
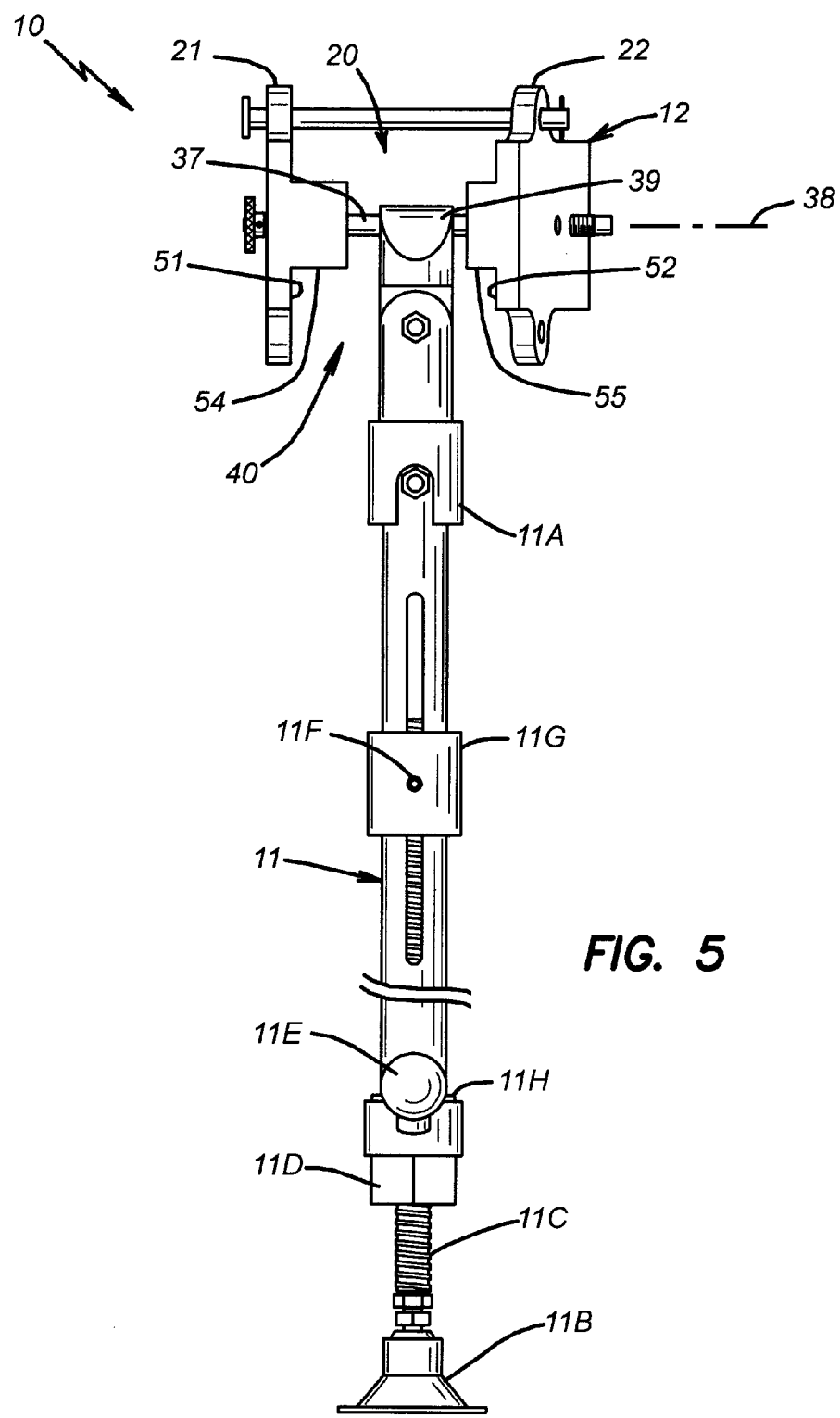
FIG. 5 is a side elevation view of just the airplane jack, as viewed looking inwardly from the left wheel assembly toward the left seat of the airplane.

FIG. 5 is a side elevation view of the airplane jack apparatus 10, as it would appear to an observer when the apparatus 10 is in the left-strut-cradling position and the observer is looking inwardly from the left wheel assembly toward the left seat of the airplane. FIG. 5 identifies a right-strut-cradling side 40 of the SCJP 12 (i.e., an RSC side 40), shown facing downwardly when the left-strut-cradling side 20 is facing upwardly. The forward and rearward components 21 and 22 are sized, shaped, and interconnected to define both a left-strut-cradling side 20 of the SCJP 12 for cradling the left strut 13 and a right-strut-cradling side 40 for cradling the right strut 16. The left-strut-cradling side 20 faces in a first direction (e.g., upwardly) and the right-strut-cradling side 40 faces in a diametrically opposite second direction (e.g., downwardly).

The right-strut-cradling side 40 of the SCJP 12 includes a vertically extending right-side or second forward surface 51 that is provided by the forward component 21 of the SCJP 12. It also includes a vertically extending right-side or second rearward surface 52 that is provided by the rearward component 22. A horizontally extending first right-side surface segment 54 provided by the forward component 21 and a horizontally extending second right-side surface segment 55 provided by the rearward component 22 combine to form the horizontally extending surface facing the underside 16C (FIG. 13) of the right strut 16. Thus, the left-strut-cradling side 20 of the SCJP 12 includes the portions of the forward and rearward components 21 and 22 that define the surfaces 31, 32, 34, and 35 (i.e., structure on a first side of a plane containing the axle axis 38) while the right-strut-cradling side 40 of the SCJP 12 includes the portions of the forward and rearward components 21 and 22 that define the surfaces 51, 52, 54, and 55 (i.e., structure on the opposite side of such a plane).

In the left-strut-cradling first position of the SCJP 12 shown in the drawings, the SCJP 12 cradles the left strut 13, with the left-side horizontally extending first and second left-side surface segments 34 and 35 of the left-strut-cradling side 20 (FIG. 3) facing upwardly toward the underside 13C of the left strut 13 while the right-strut-cradling side faces downwardly toward the horizontal support surface 15. Pivoting the SCJP 12 as shown in FIG. 13, to the right-strut-cradling second position of the SCJP 12, readies the SCJP 12 for cradling the right strut 16, with the right-side horizontally extending first and second right-side surface segments 54 and 55 of the right-strut-cradling side 40 facing upwardly toward the underside 16C of the right strut 16 and the left-strut-cradling side 20 facing downwardly toward the horizontal support surface 15.

Figure 6:
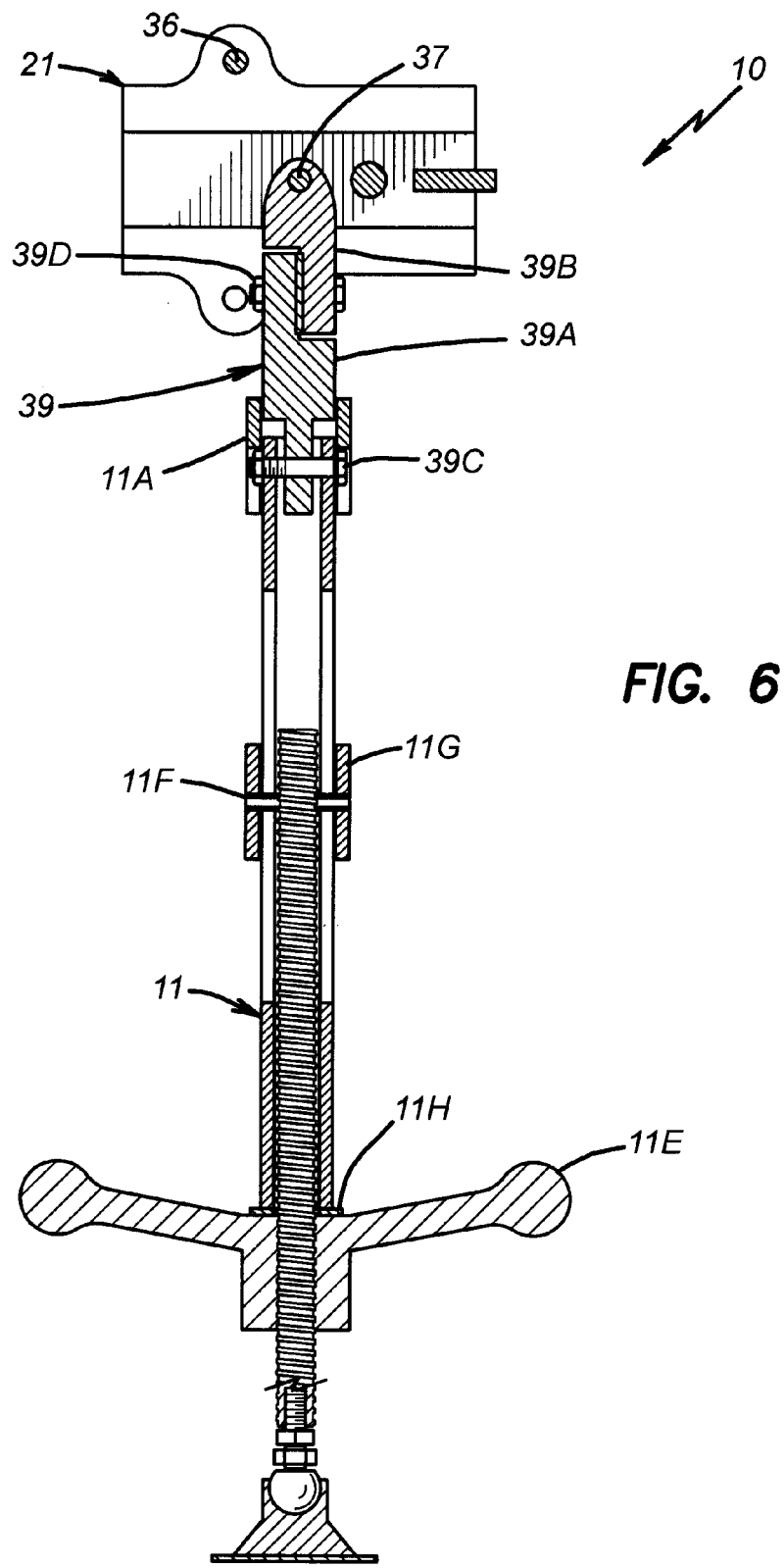
FIG. 6 is a cross-sectional elevation view of just the airplane jack, viewed from behind, as it appears in a vertical bisecting plane that is parallel to the lateral axis of the airplane (i.e., the transverse or pitch axis).
Figure 7:
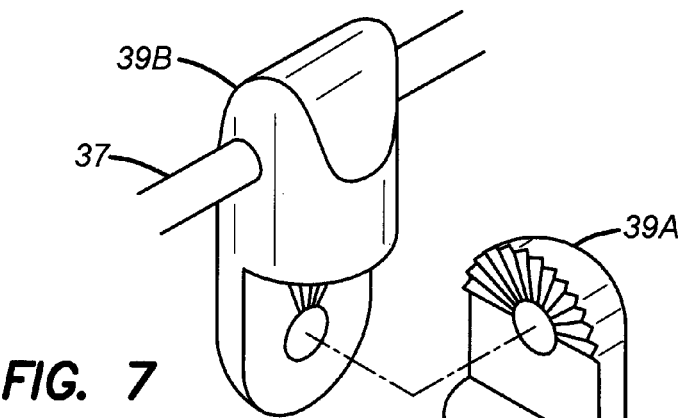
FIG. 7 is an enlarged exploded view of the coupler component.

Next, consider FIG. 6. It is a cross-sectional elevation view of just the airplane jack 10, viewed from behind, as it appears in a vertical bisecting plane that is parallel to the lateral axis of the airplane. As such, it shows the forward component 21 without the rearward component 22, although it does show a cross section of the locking component 36 that spans the forward and rearward components 21 and 22. It also shows a cross section of the coupling component 39 (or "post"). As discussed above, the upwardly disposed end portion 11A of the jack 11 is coupled by the coupling component 39 to the axle 37 so that the user can pivot the jack 11 about the axle 37 (i.e., the axle axis) when moving between the left and right struts 13 and 16. The coupling component 39 is seen in FIG. 6 to include a first part 39A that is coupled with a first nut-and-bolt combination 39C to the upwardly disposed end portion 11A. It also includes a second part 39B that is welded or otherwise rigidly connected to the axle 37. The first and second parts 39A and 39B are rigidly connected together by a second nut-and-bolt combination 39D. The net result of the foregoing arrangement is that the user can pivot the jack 11 as stated above. FIG. 7 provides an enlarged exploded view of the first and second parts 39A and 39B connected to the axle 37.

Figure 8:
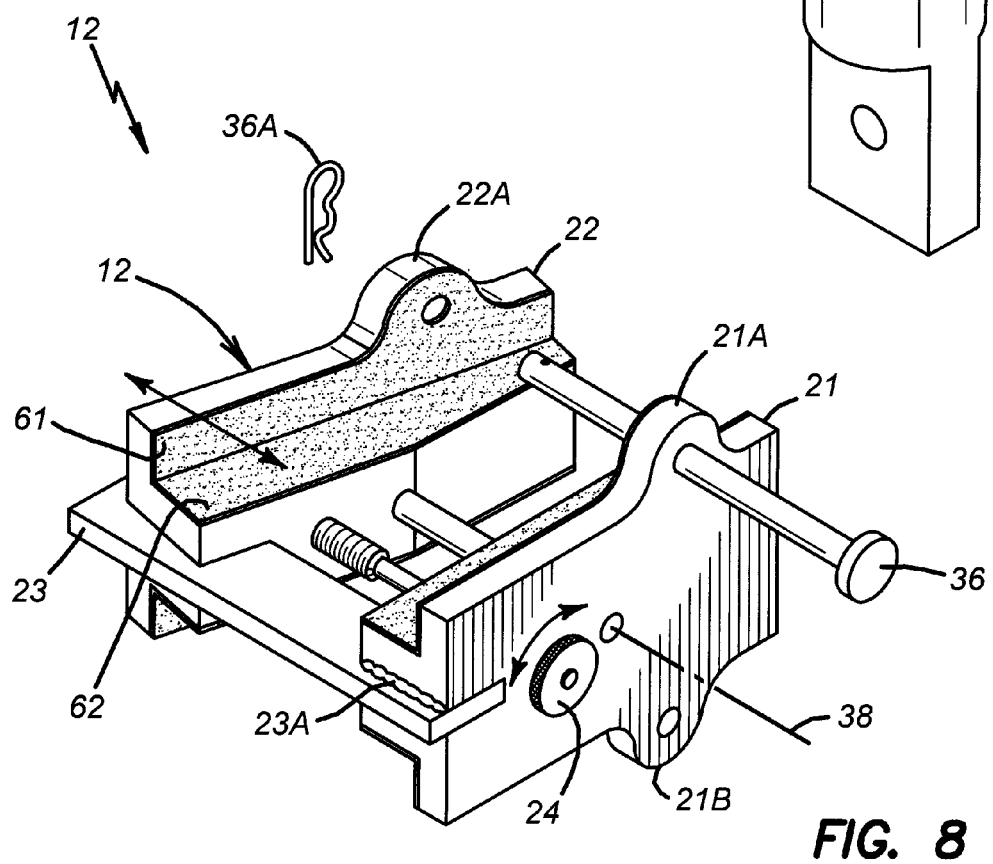
FIG. 8 is a perspective view of just the SCJP, showing adjustability features along with liner and safety-rod details.

FIG. 8 is a perspective view of just the SCJP 12, showing adjustability features, along with liner and locking-component details. A fillet weld 23A rigidly attaches the stabilizing bar 23 to the forward component 21. As the user operates the width-adjusting screw 24 (as depicted by a curved arrow in FIG. 8), the rearward component 22 slides along the stabilizing bar 23 (as depicted by a double-headed arrow in FIG. 8), thereby varying the spacing between the forward and rearward components 21 and 22 according to strut width and strut taper.

FIG. 8 shows the locking component 36 extending through a hole in an upstanding ear portion 21A of the forward component 21. When fully inserted, the locking component 36 also extends through a hole in an upstanding ear portion 22A of the rearward component 22. A lynch pin 36A secures the locking component 36 in place. An upstanding ear portion 21B is provided for right-strut usage, along with a counterpart of the upstanding ear portion 22A that is not visible in FIG. 8; it is identified, however, in FIG. 10.

Liner sheets 61 and 62 cover otherwise exposed surfaces of the rearward component 22 that bear against the left strut 13. The liner sheets 61 and 62 are composed of a deformable material that helps protect the strut 13 from being scratch or otherwise marred or damage by contact with the hard metal surfaces of the SCJP 12 (e.g., vulcanized rubber or rubber-like material attached to the aluminum). Similar liner sheets (not identified in FIG. 8 with reference numerals) cover other surfaces of the SCJP 12. The liner sheets were not shown in previous views for illustrative reasons in order to expose the underlying surfaces for discussion.

As a further idea of size, the illustrated SCJP 12 has an overall height of about four inches (i.e., about 101.61 mm) measured vertically with the SCJP 12 in an operative position. It has an overall length of about 3.840 inches measured parallel to the lateral axis of the airplane (i.e., about 97.536 mm), and the stabilizing bar 23 is about 0.25 inches thick by 1.0 inches wide by 4.25 inches long (i.e., about 6.35 mm thick by 25.40 wide by 107.95 mm long). Other dimensional aspects of the SCJP 12 can be ascertained from FIG. 8 inasmuch as they are drawn there roughly to the same scale. Of course, those dimensions may vary significantly for any of various strut-cradling jack pad designs and still have the designs fall within the scope of the broader claims presented later on. Based upon the foregoing and subsequent descriptions contained herein, and in the claims, a person of ordinary skill in the art can readily implement an airplane jack within the inventive concepts disclosed.

Figure 9:
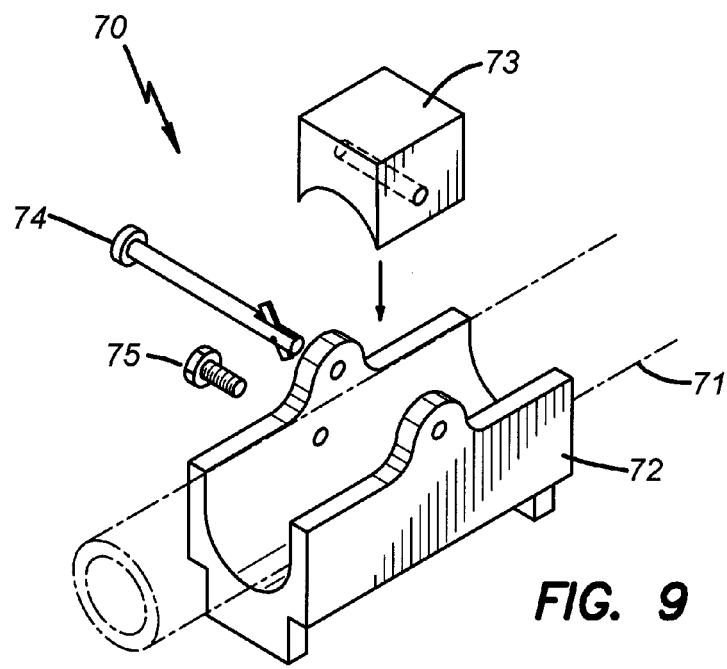
FIG. 9 is an exploded view of the tubular-strut adapter for the SCJP.
Figure 10:
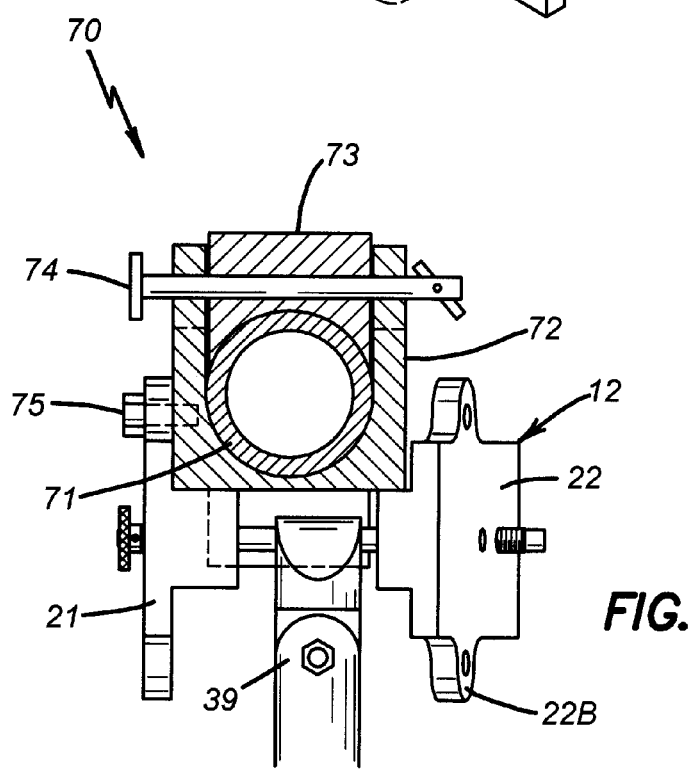
FIG. 10 is a cross sectional view of the tubular-strut adapter when the adapter is mounted on the SCJP, as viewed looking inwardly toward the left seat of the airplane in a vertical plane that is disposed parallel to the longitudinal axis of the airplane (i.e., the roll or bank axis) in a position at the very outer end of the SCJP.

FIGS. 9 and 10 show details of a tubular-strut-adapter (identified as an adapter 70) that serves as an accessory for the airplane jack 10. The user mounts the adapter 70 on the SCJP 12 in the illustrated operative position order to lift a tubular strut 71. The adapter 70 includes a tubular-strut-interfacing base 72 that mates with the SCJP 12 so that the SCJP 12 can cradle the base 72 in the place of a flat, spring-steel strut. The base 72, in turn, cradles the tubular strut 71. A block 73 that fits over the strut 71 where it is held by a pin 74, while a setscrew 75 secures the base 72 to the tubular strut 71. The user secures the base 72 to the forward component 21 of the SCJP 12 with a machine screw 75, and to the strut 71 with the block 73 and the pin 74. Then, the user operates the jack 11 portion of the airplane jack 10 to lift the SCJP 12 and the adapter 70, and thereby the strut 17.

FIGS. 11 and 12 show details of an actuator assembly 80 that serves another accessory for the airplane jack 10. It that serves to rotate the lead screw 11C of the jack 11 with power derived from a separate power driver component (not shown). The illustrated actuator assembly 80 includes a rotational-power-coupling component 81 and a flange 81 that secures the component 81 to the nut 11D of the jack 11. After mounting the actuator assembly 80 on the jack, the user couples rotational power to the component 81 using an electric or pneumatic power driver, or other source of rotational power. Doing so rotates the leadscrew 11C for strut-lifting purposes.

Summarizing the present invention with reference to FIG. 13 summarizes how the pivoting-jack-pad aspect of the invention works. It shows five positions of the SCJP 12 (identified in FIG. 13 by the reference letters A, B, C, D, and E) through which the user pivots the SCJP 12 in moving from left-strut usage to right-strut usage. The user pivots the jack pad 12 through those five positions in moving from the left-strut-cradling position A (i.e, the LSC position A for use in lifting upwardly against the underside 13C of the left strut 13 relative to a horizontal support surface 15), to the right-strut-cradling position E (i.e., the RSC position E for use in lifting upwardly against an underside 16C of a right strut 16). In working that way, the SCJP 12 overcomes shortcomings of prior art SCJP devices.

Thus, the invention provides a new and improved airplane jack 10 that pivots between left and right struts for improved operation. The user pivots the SCJP 12 through the five positions shown in FIG. 13 in moving from the left-strut-cradling position A (i.e, the LSC position A for use in lifting upwardly against the underside 13C of the left strut 13 relative to a horizontal support surface 15), to the right-strut-cradling position E (i.e., the RSC position E for use in lifting upwardly against an underside 16C of a right strut 16). In working that way, the SCJP 12 overcomes shortcomings of prior art jack pad devices.

Although an exemplary embodiment has been shown and described, a person having ordinary skill in the art may make many changes, modifications, and substitutions without necessarily departing from the spirit and scope of the invention. As for the specific terminology used to describe the exemplary embodiment, it is not intended to limit the invention; each specific term is intended to include all technical equivalents that operate in a similar manner to accomplish a similar purpose or function. For example, the terms "horizontal," "horizontally," "vertical," "vertically," "parallel," "perpendicular," and the like herein state orientations, and those terms herein include approximations of the stated orientations.

What is claimed is:

1. An apparatus for raising a selected strut on an airplane landing gear having two flat spring-steel struts, the apparatus comprising:

a jack for providing a vertically upward directed force and a strut-cradling jack pad for coupling said vertically upward directed force from the jack to the selected strut;

wherein the strut-cradling jack pad includes a forward component and a rearward component that are sized, shaped, and interconnected to define a left-strut-cradling side of the strut-cradling jack pad for cradling a left strut of the two flat spring-steel struts and a right-strut-cradling side of the strut-cradling jack pad for cradling a right strut of the two flat spring-steel struts, said left-strut-cradling side facing in a first direction and said right-strut-cradling side facing in a diametrically opposite second direction;

a jack-coupling axle on the strut-cradling jack pad that extends between the forward component and rearward component along an axis of rotation; and a jack-coupling component of the jack for coupling the jack to the jack-coupling axle pivotally so that a user can pivot the strut-cradling jack pad about an axle axis between a left-strut-cradling first position of the strut-cradling jack pad in which the left-strut-cradling side of the jack pad faces upwardly, and a right-strut-cradling second position of the strut-cradling jack pad in which the right-strut-cradling side of the strut-cradling jack pad faces upwardly;

thereby enabling use of the strut-cradling jack pad with both the left strut and the right strut without strut-dependent readjustment of the strut-cradling jack pad;

wherein the left-strut-cradling side of the strut-cradling jack pad faces upwardly toward and cradles the left strut when the apparatus is in a left-strut-lifting first operative position of the apparatus in which the jack rests upon a horizontal support surface beneath the left strut, said first direction in which the left-strut-cradling side faces being perpendicular to the axis of rotation along which the jack-coupling axle extends;

wherein the right-strut-cradling side of the strut-cradling jack pad faces upwardly toward and cradles the right strut when the apparatus is in a right-strut-lifting second operative position of the apparatus in which the jack rests upon a horizontal support surface beneath the right strut, said second direction in which the right-strut-cradling side faces being perpendicular to the axis of rotation along which the jack-coupling axle extends;

wherein the axis of rotation along which the jack-coupling axle extends is horizontally disposed when the apparatus is in the first operative position and when the apparatus is in the second operative position;

wherein the left-strut-cradling side of the strut-cradling jack pad includes a vertically extending first forward surface of the forward component that faces and abuts a forward edge of the left strut when the strut-cradling jack pad is in said left-strut-cradling first position of the strut-cradling jack pad;

wherein the left-strut-cradling side of the strut-cradling jack pad includes a vertically extending first rearward surface of the rearward component that faces and abuts a rearward edge of the left strut when the strut-cradling jack pad is in said left-strut-cradling first position of the strut-cradling jack pad;

wherein the left-strut-cradling side of the strut-cradling jack pad includes a horizontally extending first lower surface defined by a horizontally extending first left-side surface segment provided by the forward component and a horizontally extending second left-side segment provided by the rearward component, which horizontally extending first lower surface faces and abuts an underside of the left strut when the strut-cradling jack pad is in said left-strut-cradling first position of the strut-cradling jack pad;

wherein the right-strut-cradling side of the strut-cradling jack pad includes a vertically extending second forward surface of the forward component that faces and abuts a forward edge of the right strut when the strut-cradling jack pad is in said right-strut-cradling second position of the strut-cradling jack pad;

wherein the right-strut-cradling side of the strut-cradling jack pad includes a vertically extending second rearward surface of the rearward component that faces and abuts a rearward edge of the right strut when the strut-cradling jack pad is in said right-strut-cradling second position of the strut-cradling jack pad; and wherein the right-strut-cradling side of the strut-cradling jack pad includes a horizontally extending second lower surface defined by a horizontally extending first right-side surface segment provided by the forward component and a horizontally extending second right-side surface segment provide by the rearward component, which horizontally extending second lower surface faces and abuts an underside of the right strut when the strut-cradling jack pad is in said right-strut-cradling second position of the strut-cradling jack pad.

2. An apparatus as recited in claim 1, wherein the strut-cradling jack pad includes securing means for securing the strut-cradling jack pad on the selected strut, said securing means including a locking component mounted removably on the forward and rearward components in a position to span the forward and rearward components over an upper side of the selected strut when the strut-cradling jack pad is in an operative position on the selected strut.

3. An apparatus as recited in claim 1, wherein the forward and rearward components of the strut-cradling jack pad are interconnected adjustably to enable a user to manually adjust the strut-cradling jack pad according to various strut widths.

4. An apparatus as recited in claim 1, wherein the jack includes:
   a lead screw; and
   an actuator component for rotating the lead screw with power derived from a separate power driver component.

5. An apparatus as recited in claim 1, wherein the axis of rotation extends horizontally and parallel to a vertical plane containing the longitudinal axis of the airplane.

6. An apparatus as recited in claim 1, further comprising a tubular-strut adapter component that functions as means for enabling the user to use the strut-cradling jack pad with a selected tubular strut, said tubular-strut adapter component having a jack-pad-interfacing side that is shaped and dimensioned to fit on the strut-cradling jack pad in the place of a flat, spring-steel strut, and a strut-cradling side that is shaped and dimensioned to cradle the selected tubular strut.

\* \* \* \* \*